United States Patent [19]

Sakono et al.

[11] Patent Number: 4,997,262

[45] Date of Patent: Mar. 5, 1991

[54] LIQUID CRYSTAL DISPLAY ELEMENT

[75] Inventors: Ikuo Sakono, Osaka; Motokazu Inui, Kawachinagano; Hiroaki Kato, Nara, all of Japan

[73] Assignee: Sharp Kabushiki Kaisha, Osaka, Japan

[21] Appl. No.: 515,362

[22] Filed: Apr. 30, 1990

[30] Foreign Application Priority Data

Aug. 26, 1987 [JP] Japan ................. 62-212304

[51] Int. Cl.⁵ .................... G02F 1/13; H01L 27/01
[52] U.S. Cl. .................... 350/331 R; 350/332; 350/333; 350/336; 357/23.7
[58] Field of Search .............. 350/331 R, 332, 333, 350/336; 357/23.7

[56] References Cited

U.S. PATENT DOCUMENTS

| | | | |
|---|---|---|---|
| 4,646,424 | 3/1987 | Parks et al. | 357/23.7 |
| 4,778,258 | 10/1988 | Parks et al. | 350/336 |

FOREIGN PATENT DOCUMENTS

| | | |
|---|---|---|
| 0125666 | 11/1984 | European Pat. Off. |
| 0196915 | 10/1986 | European Pat. Off. |
| 0209113 | 1/1987 | European Pat. Off. |
| 0211402 | 2/1987 | European Pat. Off. |
| 0124319 | 7/1984 | Japan .................. 357/23.7 |
| 0209862 | 9/1987 | Japan .................. 357/23.7 |
| 2139812 | 11/1984 | United Kingdom ...... 357/23.7 |

*Primary Examiner*—Stanley D. Miller
*Assistant Examiner*—Trong Phan

[57] ABSTRACT

A liquid crystal display element for matrix display, employing, as address elements, thin film transistors each having a layered arrangement of a gate electrode, an insulating film, a semiconductor film, a source electrode, a drain electrode and a display picture element electrode formed in that order on an insulating substrate. The liquid crystal display element is characterized by a thin metallic film for smoothing path lines for the source electrodes, formed of the same material as that forming the gate electrodes in a plane including the gate electrodes.

5 Claims, 3 Drawing Sheets

LIQUID CRYSTAL DISPLAY ELEMENT

This application is a continuation-in-part, of application Ser. No. 07/203,985 filed on June 8, 1988, now abandoned.

BACKGROUND OF THE INVENTION

Field of the Invention

The present invention relates to a matrix liquid crystal display element employing thin film transistors (hereinafter abbreviated to "TFTs") as address element and, more specifically as a matrix liquid crystal display elements employing inverse stagger TFTs using an amorphous silicon film as a semiconductor film as address elements.

Description of the Prior Art

FIGS. 3(a) and 3(b) illustrate the construction of an exemplary matrix liquid crystal display element employing inverse stagger TFTs as address elements. This liquid crystal display element is formed by forming gate electrodes 3, a gate insulating film 4, an amorphous silicon (hereinafter referred to as "a-Si") film 5, an insulating film 6, an n+-type a-Si film 7, source and drain electrodes 8, picture element electrodes 9 for display and a protective film 10 one over another on an insulating substrate 1. The insulating substrate 1 is a glass plate, and the gate electrodes 3 are formed of tantalum (Ta). When the gate electrodes 3 are formed by a wet etching process using a tantalum etching solution, the glass insulating substrate 1 is eroded by the etching solution and thereby the surface of the glass insulating substrate 1 becomes cloudy and rough. Nevertheless, no structure for solving such a problem has been known. FIG. 4 illustrates another conventional liquid crystal display element which includes an insulating film 2 in addition to the above-noted elements illustrated in FIGS. 3(a) and 3(b).

SUMMARY OF THE INVENTION

Accordingly, it is an object of the present invention to provide a structure capable of obviating the direct wetting of the surface of the glass insulating substrate of a liquid crystal display element in forming the liquid crystal display element.

It is another object of the present invention to provide a matrix liquid crystal display element employing inverse stagger TFTs as address elements, and having less possibility for the breaking of connecting lines.

Briefly described, in accordance with the present invention, a liquid crystal display element comprises an insulating substrate, inverse stagger TFTs formed on the insulating substrate, and a metallic thin film formed of a gate material for smoothing source bus lines, formed under the source bus lines in flush with the gate electrodes of the TFTs.

The metallic thin film formed simultaneously with the gate electrodes smoothens the source bus lines to prevent the breaking of the source bus lines.

BRIEF DESCRIPTION OF THE DRAWINGS

The present invention will become more fully understood from the detailed description given hereunder and the accompanying drawings which are given by way of illustration only, and thus are not limitative of the present invention and wherein.

DESCRIPTION OF THE PREFERRED EMBODIMENT

Figure 1:
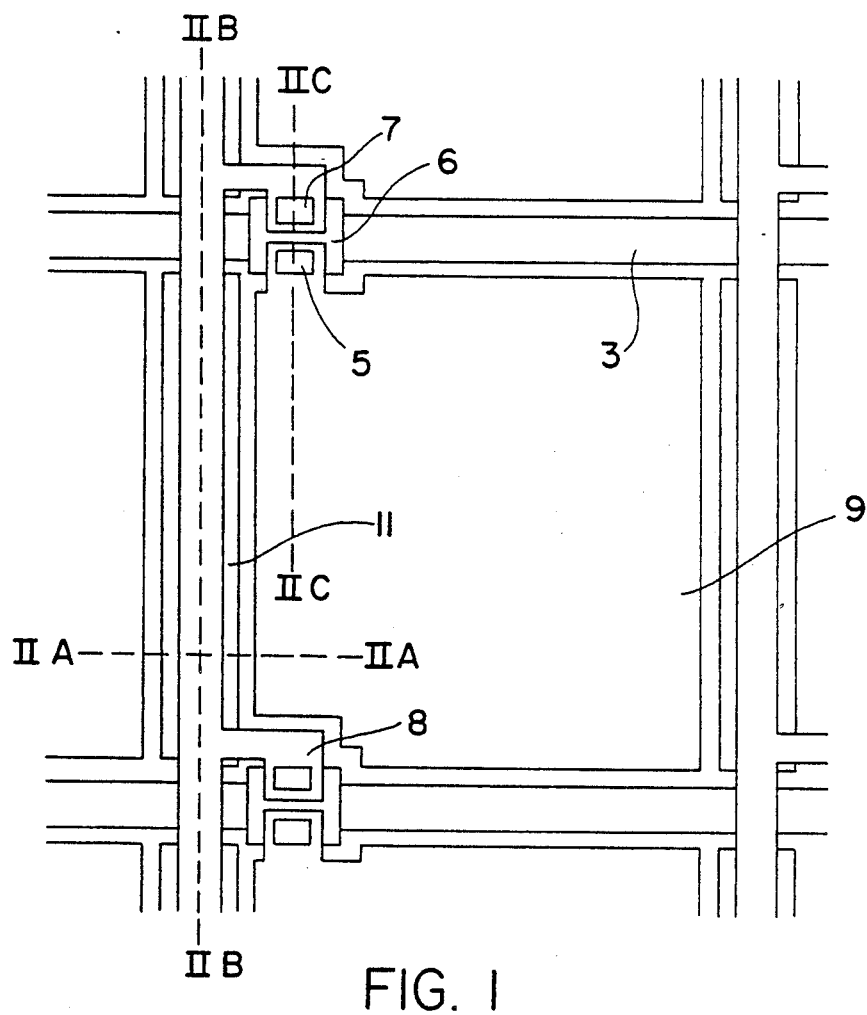
FIG. 1 is a plan view of a liquid crystal display element, in a preferred embodiment, according to the present invention.
Figure 4:
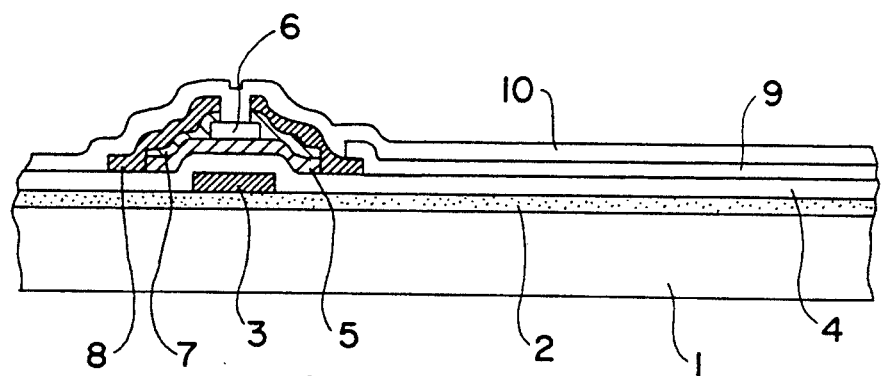
FIG. 4 is a sectional view of another conventional liquid crystal display element.
Figure 2A:
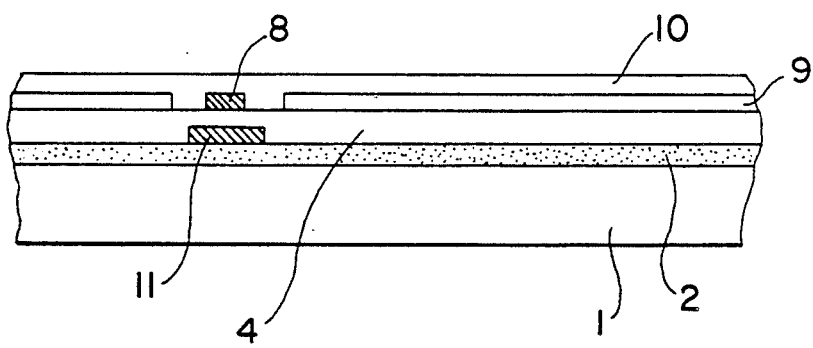
FIG. 2(a) is a sectional view taken on line IIA—IIA in FIG. 1.
Figure 2B:
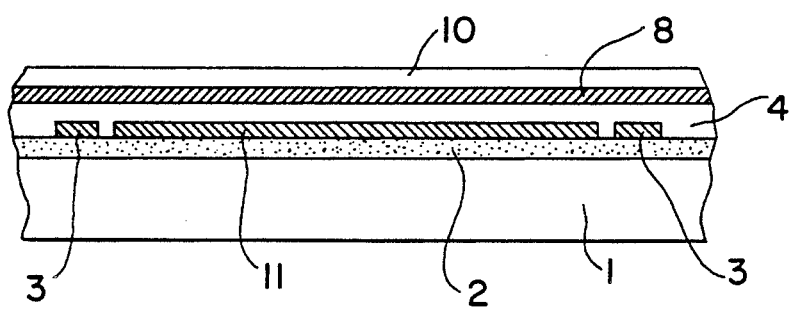
FIG. 2(b) is a sectional view taken on line IIB—IIB in FIG. 1.
Figure 2C:
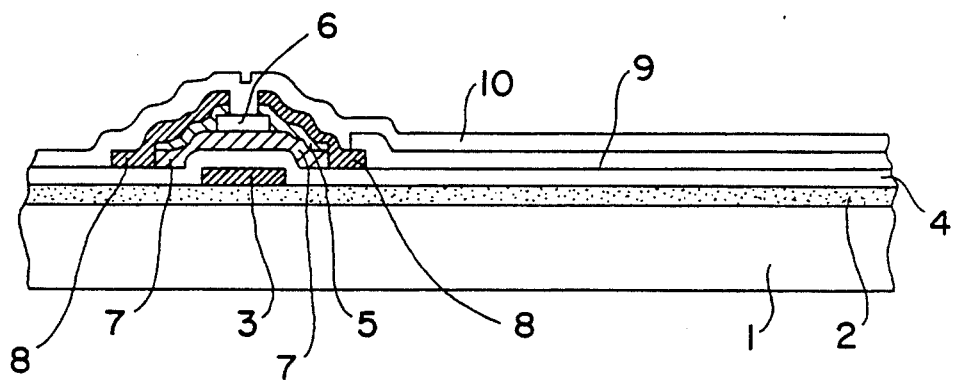
FIG. 2(c) is a sectional view taken on line IIC—IIC in FIG. 1.
Figure 3A:
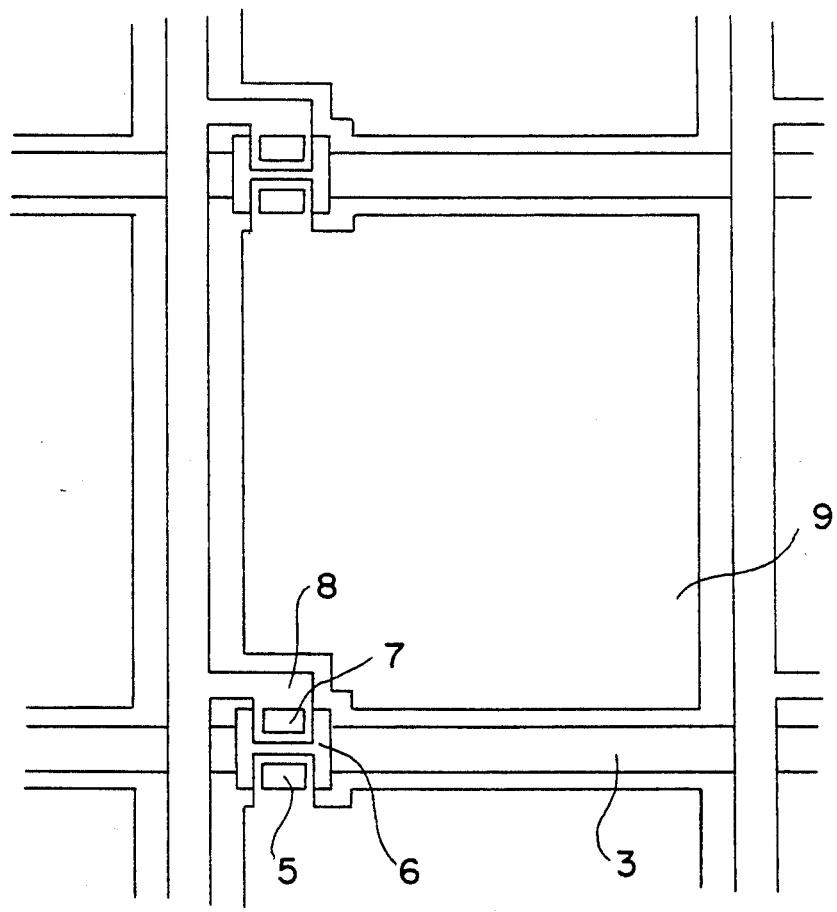
FIG. 3(a) is a plan view of an exemplary conventional liquid crystal display element.
Figure 3B:
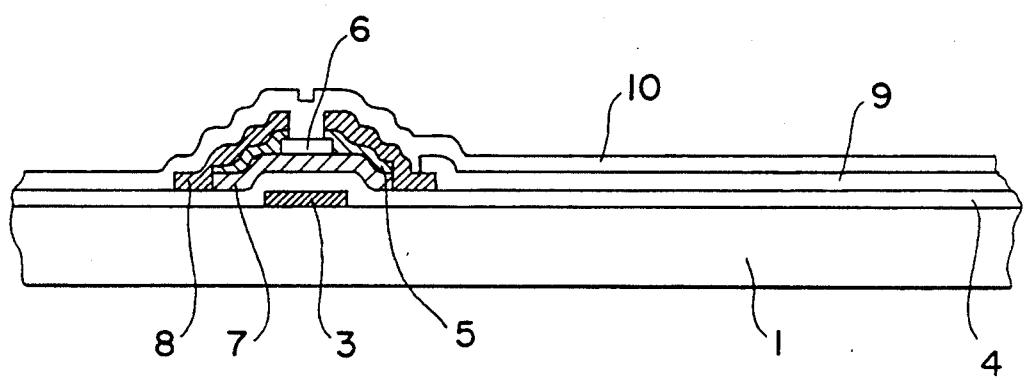
FIG. 3(b) is a sectional view of the conventional liquid crystal display element of FIG. 3(a)

A liquid crystal display element, in a preferred embodiment, according to the present invention will be described in detail hereinafter with reference to FIGS. 1, 2(a), 2(b) and 2(c). Tantalum pentaoxide ($Ta_2O_5$) is deposited by sputtering over the surface of an insulating substrate 1 formed of glass to form an insulating film 2 of approximately 3000Å in thickness over the surface of the insulating substrate 1. Then, a tantalum film of approximately 3000Å in thickness is formed over the insulating film 2 by sputtering. The tantalum film is patterned by photoetching to form gate electrodes 3 and a ground metallic thin film 11 in the same plane. Then, an insulating film 4 of $SiN_x$ having a thickness of approximately 4000Å is formed over the gate electrodes 3 and the ground metallic thin film 11 through a plasma chemical vapor deposition process (hereinafter referred to as "plasma CVD process"). Subsequently, a semiconductor film, i.e., an a-Si film, of approximately 300Å in thickness and an insulating film, i.e., a $SiN_x$ film, of approximately 2000Å in thickness are formed in that order. The semiconductor film and the insulating film are subjected to photoetching to form a patterned semiconductor film 5 and a patterned insulating film 6. Then, a semiconductor film, i.e., an n+-type a-Si film, is formed in a thickness of approximately 400Å through a plasma CVD process, and then the semiconductor film is subjected to photoetching to form a patterned semiconductor film 7. Then, Ti, Mo or W is deposited in a film having a thickness of approximately 3000Å through sputtering or electron beam evaporation, and then the film is subjected to photoetching to form source and drain electrodes 8. Then, a transparent conductive film having a thickness of approximately 1000Å and containing indium oxide as a principal component is formed through sputtering or electron beam evaporation, then the transparent conductive film is subjected to photoetching to form picture element electrodes 9. Then, a protective film 10, i.e., a $SiN_x$ film, of approximately 5000Å in thickness is formed through a plasma CVD process. Thus obtained is a matrix liquid crystal display element comprising the gate electrodes 3 and a thin metallic film 11 formed of the same material as that of the gate electrodes 3 and formed in the same plane under the source bus lines.

The thin metallic film 11 protects the insulating substrate 1 from the erosive action of the etching solutions, and hence the possibility of the breaking of the source bus lines is reduced.

As is apparent from the foregoing description, according to the present invention, the matrix liquid crystal display element of the present invention includes a thin metallic film formed of the same material as that of the gate electrodes and formed under the source bus lines in a plane containing the gate electrodes. Accordingly, the insulating substrate is protected from the erosive action of the etching solutions by the thin metallic film, so that the possibility of the breaking of the lines is reduced.

Although the present invention has been described in its preferred form with a certain degree of particularity, it will be apparent to those skilled in the art that various changes and modifications may be made therein without departing from the spirit and scope of the present invention as claimed.

What is claimed is:

1. A liquid crystal display device comprising:
   an insulating substrate;
   an insulating film formed on the insulating substrate;
   a plurality of row and column electrodes formed on the insulating film, said column electrodes having a first predetermined width;
   a plurality of thin film transistors formed on the insulating film at the intersections of the row and column electrodes, each of said thin film transistors having a gate electrode connected to each of the row electrodes, a source electrode and a drain electrode, either of the source and drain electrodes being connected to the column electrode;
   a plurality of picture element electrodes formed on the insulating film, each of the picture element electrodes being connected to the other of the source and drain electrodes; and
   thin film layers formed along and under the column electrodes between the row electrodes and formed in the same plane as that of the row electrodes, each of said thin film layers having a second predetermined width greater than or equal to said predetermined width of the column electrodes to prevent the insulating substrate from being etched.

2. A liquid crystal display device as claimed in claim 1, wherein the row electrodes and the thin film layers comprise the same material.

3. A liquid crystal display device as claimed in claim 2, wherein the row electrodes and the thin film layers comprise tantalum.

4. A liquid crystal display device as claimed in claim 1, wherein the thin film transistors are of reverse stagger type.

5. A liquid crystal display device as claimed in claim 1, wherein the insulating film comprises a tantalum pentaoxide film.

* * * * *